US008860684B1

(12) United States Patent
Gandhi et al.

(10) Patent No.: US 8,860,684 B1
(45) Date of Patent: Oct. 14, 2014

(54) SYSTEM AND METHOD OF LOCATING A TOUCH BASED ON A COMBINATION OF PINS (75) Inventors: Nitin Gandhi, New Delhi (IN); Narayana Swamy, Karnataka (IN)

(73) Assignee: Cypress Semiconductor Corporation, San Jose ( * ) Notice: Subject to any disclaimer, the term of this patent is extended or adjusted under 35 U.S.C. 154(b) by 912 days.

(21) Appl. No.: 12/238,918

(22) Filed: Sep. 26, 2008

(51) Int. Cl.
G06F 3/041 (2006.01)
G06F 3/045 (2006.01)
G06F 3/044 (2006.01)
G08C 21/00 (2006.01)

(52) U.S. Cl.
USPC .................... 345/174; 345/173; 178/18.08

(58) Field of Classification Search
USPC .................. 345/173–178; 341/15; 178/18.06, 178/18.01–20.04; 348/173
See application file for complete search history.

(56) References Cited

U.S. PATENT DOCUMENTS

| 5,488,204 | A * | 1/1996 | Mead et al. ............... 178/18.06 |
| 5,790,106 | A * | 8/1998 | Hirano et al. ................ 345/173 |
| 7,164,087 | B2 * | 1/2007 | Levy ............................ 200/5 A |
| 2006/0279551 | A1 * | 12/2006 | Lii et al. ....................... 345/173 |
| 2008/0007539 | A1 * | 1/2008 | Hotelling ...................... 345/173 |
| 2009/0284495 | A1 * | 11/2009 | Geaghan et al. ............. 345/174 |
| 2009/0322410 | A1 * | 12/2009 | David et al. .................. 345/174 |

* cited by examiner

Primary Examiner — Ryan A Lubit
(74) Attorney, Agent, or Firm — Lowenstein Sandler LLP (57) ABSTRACT Touch sensor methods, devices and systems are disclosed. One embodiment of the present invention pertains to a touch sensing system comprising a touch screen having an array of multiple conductive nodes. A shape of each conductive node is designed such that a touch to a target conductive node generates a low capacitance on one or more neighboring conductive nodes of the target conductive node and a high capacitance generated on the target conductive node. The touch sensing system further may comprise a processor coupled to the touch screen for locating the touch by processing the low capacitance and the high capacitance, where the conductive nodes are coupled to their respective input/output (I/O) pins associated with the processor. Additionally, within the array, each target conductive node coupled to the same I/O pin may comprise a different neighboring conductive node.

15 Claims, 11 Drawing Sheets

SYSTEM AND METHOD OF LOCATING A TOUCH BASED ON A COMBINATION OF PINS

FIELD OF TECHNOLOGY

Embodiments of the present invention relate to the field of electronics. More particularly, embodiments of the present invention relate to a touch sensing system and method.

BACKGROUND

A touch screen or touch sensing screen is a display which can detect a touch on the surface of a display screen. The touch screen may have a set of buttons (e.g., texts, icons, avatars, etc.) displayed, and a software function may be initiated when one of the buttons is pressed. Many of today's touch screens use capacitance sensing and resistance sensing to identify a button touch.

A capacitive touch screen conducts a continuous electrical current across its sensors, which may be conductive nodes forming one or more buttons. When a button is activated with a finger, a capacitance is formed between the finger covering the button and the button itself. When the normal capacitance field of the conductive node is altered by the contact to the button, an electronic circuit is used to process and identify the activated button by measuring a change in its capacitance.

When the touch button based capacitance sensing system is used, a large number of buttons may be implemented as a matrix where each button is identified by the row and column of the button. For example, an M×M array of buttons on the touch screen can be implemented by electrically connecting each row and column of the array to an input/output (I/O) pin of a processor (e.g. of a programmable device). The touch screen periodically scans its rows and columns and identifies an activated button by reading a change in the capacitance associated with the button. Thus, when a button in the first row (e.g., which is coupled to I/O pin #1) and the second column (e.g., which is coupled to I/O pin #8) is pressed in a 6×6 array of buttons, the activated button can be identified when capacitance changes are detected in the I/O pin #1 and the I/O pin #8, respectively. During the operation of the system, the I/O pins of the processor are continually scanned for any capacitance changes, and the touch to the button is identified when there are readouts for I/O pins which correspond to the row and the column associated with the button.

However, to implement the readout scheme for the M×M array, the system uses 2×M number of I/O pins which traverse the surface and are coupled to M columns and M rows, respectively. As applications like PDAs, cell phones, remote controls and/or other devices have buttons ranging from 20 to 40 (e.g., to implement a keyboard, etc.), they consume a very large number of I/O pins. In general, as the number of I/O pins specified increases, so does the real estate of the chip and the cost of the electronics.

SUMMARY

One embodiment of the present invention pertains to a touch sensing system, comprising a touch screen having multiple conductive nodes. A shape of each conductive node is designed such that a touch to a target conductive node generates a low capacitance on one or more neighboring conductive nodes of the target conductive node in addition to a high capacitance generated on the target conductive node. The touch sensing system further comprises a processor coupled to the touch screen for locating the touch by processing the low capacitance reading and the high capacitance reading, where the conductive nodes are coupled to their respective input/output (I/O) pins associated with the processor. Additionally, each target conductive node coupled to a same I/O pin comprises a different set of neighboring conductive nodes. The contact button is therefore determined by recognizing which node has the high reading and by examining the neighbors reporting low readings. A special matrix design of node placements may eliminate duplicate node identification by providing a unique neighbor assignment.

Another embodiment of the present invention pertains to a method for detecting a touch to a touch screen which has multiple conductive nodes. The method comprises scanning input/output (I/O) pins associated with the conductive nodes for capacitances formed in response to the touch on a target conductive node and one or more neighboring conductive nodes of the target conductive node. The method also comprises comparing a high capacitance formed in response to the touch on the target conductive node with a first threshold value and comparing a low capacitance formed in response to the touch on the at least one neighboring conductive node with a second threshold value. The method further comprises identifying the target conductive node based on the scanning of the I/O pins if the high capacitance is greater than the first threshold value and the low capacitance is greater than the second threshold value. A special node placement matrix may insure unique neighbor placement for each target node.

BRIEF DESCRIPTION OF THE DRAWINGS

Example embodiments are illustrated by way of example and not limitation in the figures of the accompanying drawings, in which like references indicate similar elements and in which.

Other features of the present embodiments will be apparent from the accompanying drawings and from the detailed description that follows.

DETAILED DESCRIPTION

A method, device and/or system are disclosed that may reduce the number of I/O pins used for operating a touch screen. By using a new sensor design which uses a fewer number of I/O pins than the current touch screen technology entails, the IC package size of the processor for the touch screen can be significantly reduced. Thus, embodiments include a readily manufacturable, low cost touch screen with fewer numbers of I/O interfaces.

As illustrated in the detailed description, other embodiments also pertain to methods, devices and systems that reduce the number of I/O pins used to process a touch on the touch sensing device as well as to reduce the cost and complexity of manufacturing the device. Through utilizing a sensor made of a target conductive node and its neighboring nodes and a method and mechanism for locating a touch on the sensor, the embodiments provide a more robust, dependable and inexpensive touch sensing device. For instance, a touch matrix in accordance with an embodiment of the present invention can allow a matrix of N×N buttons while using N I/O pins.

Reference will now be made in detail to the embodiments of the invention, examples of which are illustrated in the accompanying drawings. While the invention will be described in conjunction with the embodiments, it will be understood that they are not intended to limit the invention to these embodiments. On the contrary, the disclosure is intended to cover alternatives, modifications and equivalents, which may be included within the spirit and scope of the invention. Furthermore, in the detailed description, numerous specific details are set forth in order to provide a thorough understanding of the present disclosure. However, it will be obvious to one of ordinary skill in the art that the present disclosure may be practiced without these specific details. In other instances, well known methods, procedures, components, and circuits have not been described in detail as not to unnecessarily obscure aspects of the present invention.

Figure 1A:
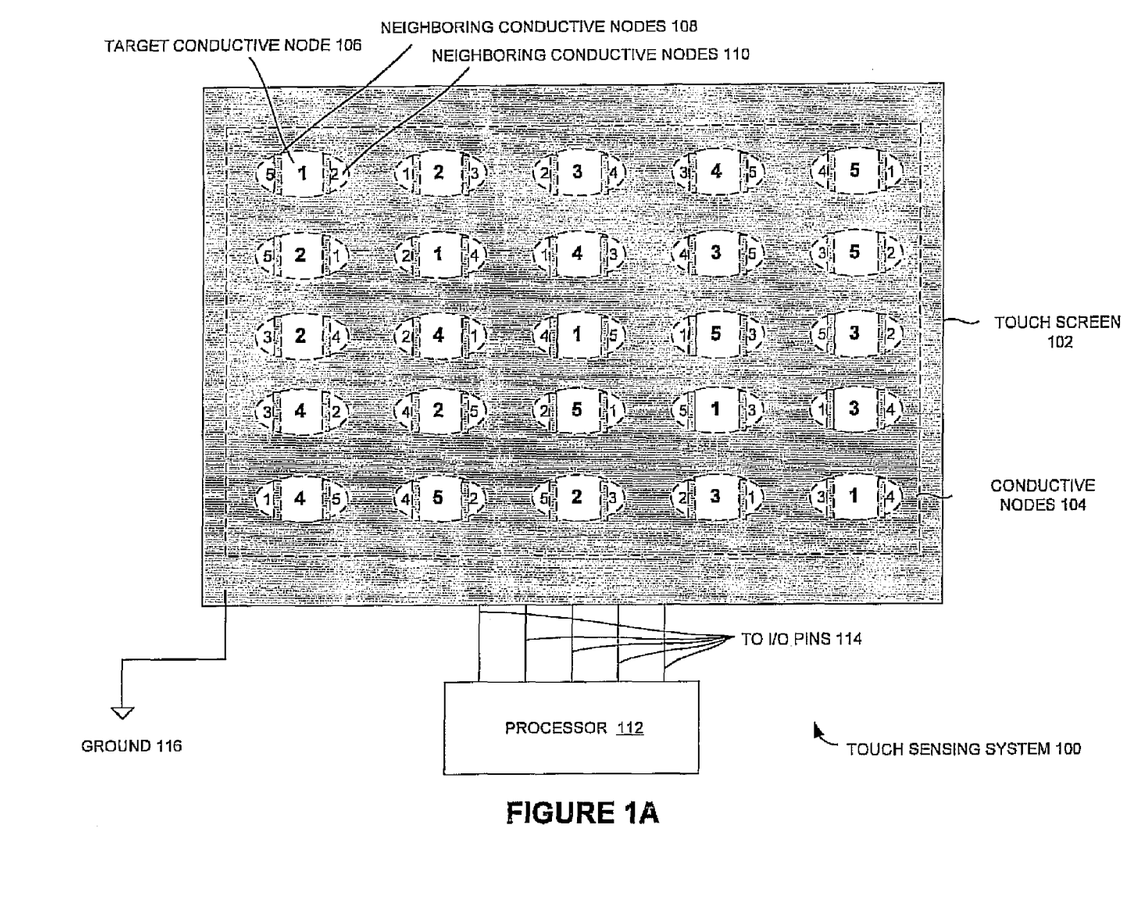
FIG. 1A illustrates an exemplary touch sensing system, according to one embodiment of the present invention.

FIG. 1A illustrates an exemplary touch sensing system 100, according to one embodiment with the novel node matrix. In FIG. 1A, the touch sensing system 100 comprises a touch screen 102 having a matrix which contains a number of conductive nodes 104, where each conductive node is represented as a number. A node is an electrical node and all node numbers are therefore coupled together. The conductive nodes 104 may be made by any conductive material, such as, an indium tin oxide (ITO) or polyethylene dioxythiophene (PDOT). An area in the touch screen which is not occupied by the conductive nodes 104 may be grounded (e.g., ground 116) so that a touch to the area may not initiate any unintended software function. Nodes are connected by traces that traverse one or more layers of the matrix.

In one exemplary implementation, three adjacent conductive nodes (e.g., a target conductive node and its two neighboring conductive nodes) may be represented as a button. It is appreciated that the target conductive node 106 and its two neighboring conductive nodes 108 are electrically separated as illustrated in FIG. 1A. A shape of each conductive node may be designed such that a touch to the target conductive node in the middle generates a low capacitance on the neighboring conductive nodes of the target conductive node in addition to a high capacitance generated on the target conductive node. Moreover, a touch to the button may be recognized if the capacitance formed between a touching object (e.g., a finger) and the target conductive node of the button surpasses a first threshold value, and the capacitance formed between the touching object and the neighboring conductive nodes surpasses a second threshold value. By doing so, the touch sensing system 100 can be immune to a user's unintended brush with the button or conductive nodes.

The touch sensing system 100 also comprises a processor 112 coupled to the touch screen 102 for locating the button associated with the touch by processing the low capacitance and the high capacitance, where each conductive node is coupled to an input/output (I/O) pin 114 associated with the processor 112. In addition, each target conductive node is coupled to a same I/O pin and comprises a different set of neighboring conductive nodes within the matrix. For example, in FIG. 1A, there are five buttons having "1" as their target conductive nodes, such as "512", "214", "415", ""513" and "314". Among those buttons, their respective neighboring conductive nodes are different from each other. Within the node matrix, each target conductive node has a unique layout of neighboring nodes according to the node assignments within the matrix. And, this enables the touch sensing system 100 to differentiate the buttons from each other.

In one exemplary implementation, the multiple conductive nodes may be arranged in a matrix or matrices as illustrated in FIG. 1A. Thus, if the button represented by "1" as its target conductive node 106 and "5" and "2" as its neighboring conductive nodes 108 and 110 are pressed, the touch sensing system 100 can identify the activated button by processing the measures of capacitances (e.g., in capacitance, current, voltage, etc.) detected in pin #1, pin #5, and pin #2. Thus, the touch sensing system 100 uses 5 input/output (I/O) pins to detect a single or multiple button presses for the 5×5 array touch sensing system 100 as illustrated in FIG. 1A. In an alternative embodiment, the conductive nodes 104 may be formed in a row, a column and/or a diagonal. The matrix shown is N×N, but could be N×M where N is not equal to M.

For instance, in another embodiment, a touch sensing device comprises a touch screen having multiple conductive nodes in an array of matrix of nodes having N×M nodes where N is not equal to M. A shape of each conductive node in the screen is designed such that a touch to a target conductive node generates respective low capacitances on two neighboring conductive nodes of the target conductive node 106 in addition to a high capacitance on the target conductive node. The device also comprises a processor coupled to the touch screen for locating the touch by processing the low capacitances and the high capacitance, where each conductive node is coupled to an input/output (I/O) pin associated with the processor. In addition, each target conductive node coupled to a same I/O pin comprises a different set of the neighboring conductive nodes.

Figure 1B:
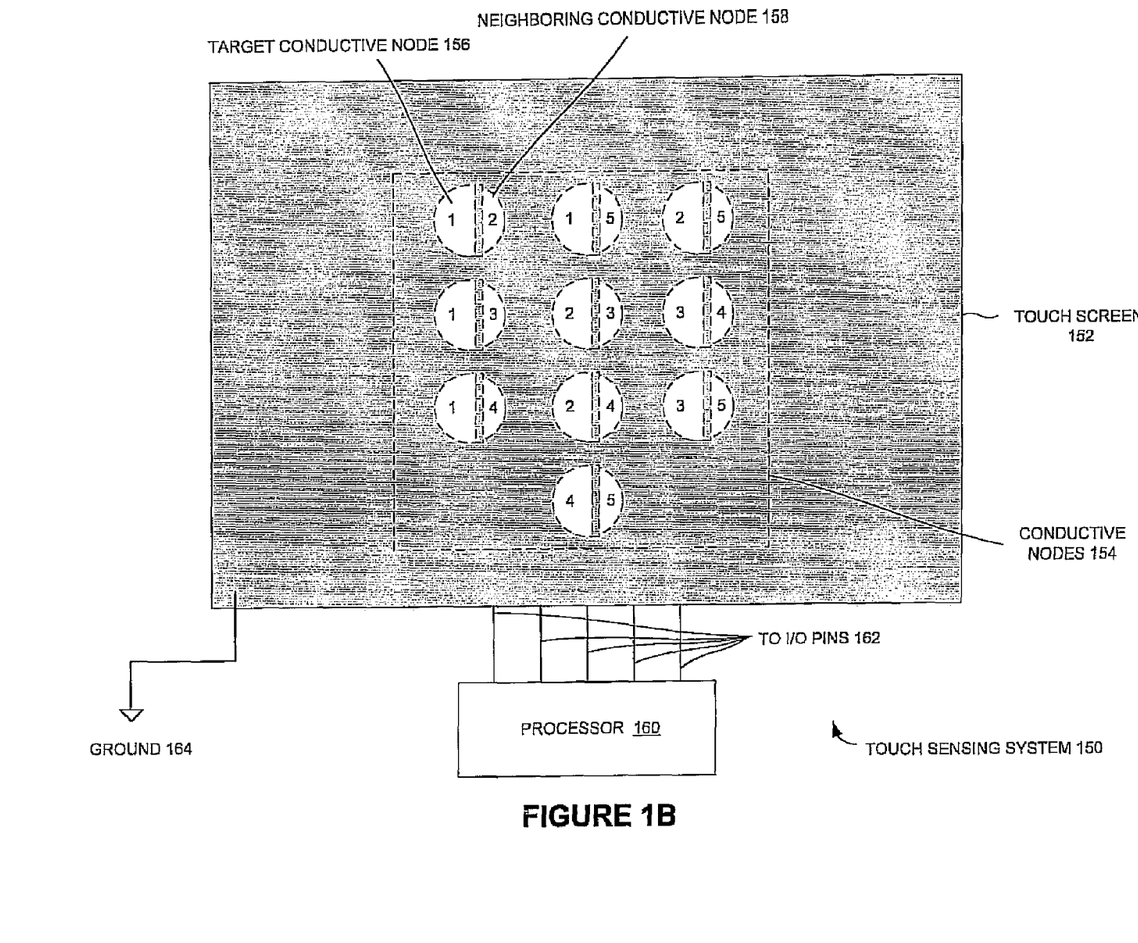
FIG. 1B illustrates another exemplary touch sensing system, according to one embodiment of the present invention.

FIG. 1B illustrates another exemplary touch sensing system 150, according to one embodiment of the present invention. In FIG. 1B, the touch sensing system 150 comprises a touch screen 152 having a matrix which contains a number of conductive nodes 154, where each conductive node is represented as a number. A node is an electrical node and all node numbers are therefore coupled together. The conductive nodes 154 may be made by any conductive material, such as, an indium tin oxide (ITO) or polyethylene dioxythiophene (PDOT). An area in the touch screen which is not occupied by the conductive nodes 154 may be grounded (e.g., ground 164) so that a touch to the area may not initiate any unintended software function. Nodes are connected by traces that traverse one or more layers of the matrix.

In one exemplary implementation, two adjacent conductive nodes (e.g., a target conductive node and its single neighboring conductive node) may be represented as a button. It is appreciated that the target conductive node 156 and its single neighboring conductive node 158 are electrically separated as illustrated in FIG. 1B. A shape of each conductive node may be designed such that a touch to the target conductive node at the left generates a low capacitance on the neighboring conductive node of the target conductive node in addition to a high capacitance generated on the target conductive node.

This can be achieved by making the contact area of the target conductive node greater than the neighboring conductive node.

Moreover, a touch to the button may be recognized if the capacitance formed between a touching object (e.g., a finger) and the target conductive node of the button surpasses a first threshold value, and the capacitance formed between the touching object and its neighboring conductive node surpasses a second threshold value. By doing so, the touch sensing system 150 can be immune to a user's unintended brush with the button or conductive nodes.

The touch sensing system 150 also comprises a processor 160 coupled to the touch screen 152 for locating the button associated with the touch by processing the low capacitance and the high capacitance, where each conductive node is coupled to an input/output (I/O) pin 162 associated with the processor 160. In addition, each target conductive node is coupled to a same I/O pin and comprises a different neighboring conductive node within the matrix. For example, in FIG. 1B, there are 10 buttons with 10 different combinations of conductive nodes which couple to 5 different I/O pins. It is appreciated that more number of buttons are possible with the variation of the contact areas for the target conductive nodes and the neighboring conductive nodes.

Figure 2A:
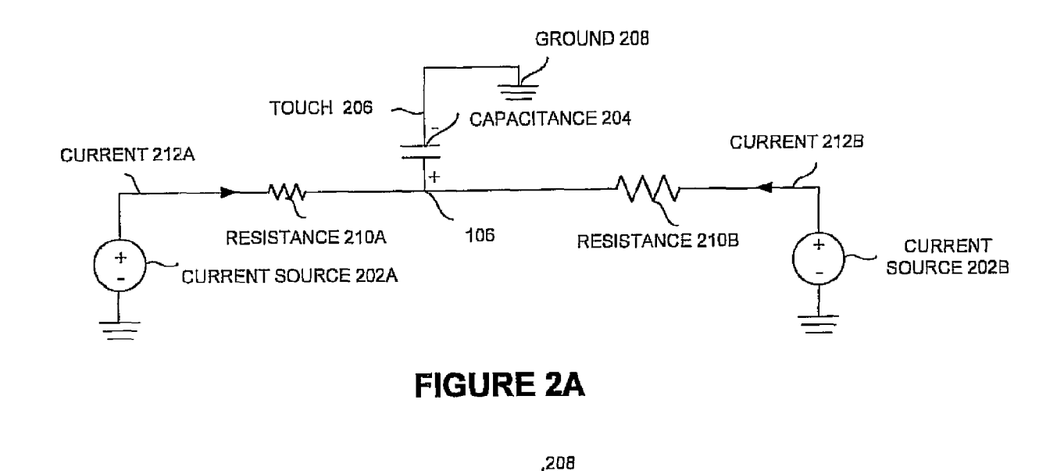
FIGS. 2A, 2B, 2C, 2D, 2E and 2F illustrate exemplary circuits for detecting a touch to the touch sensing system of FIG. 1A, according to one embodiment.
Figure 2B:
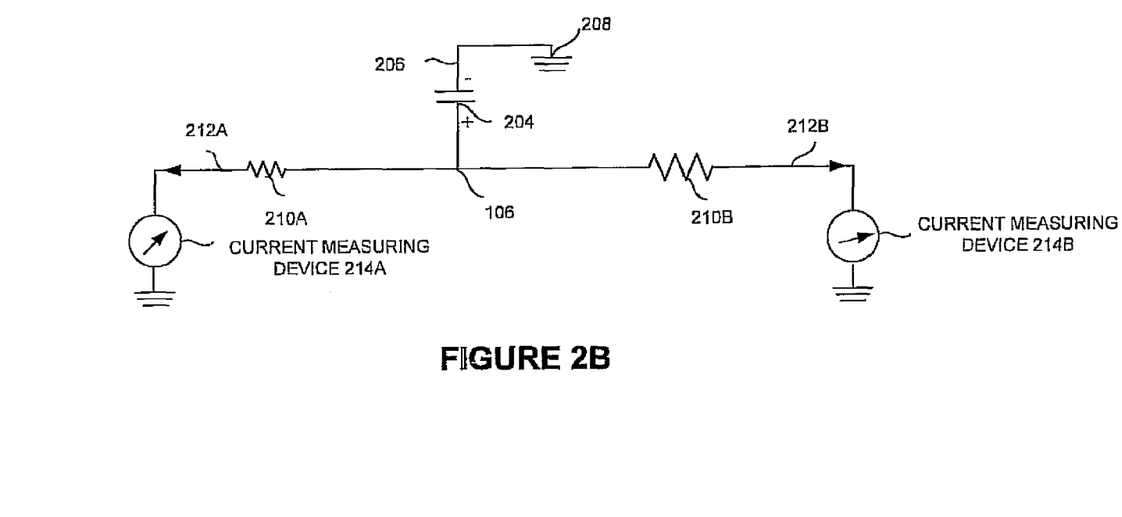

Although any capacitive measuring technique can be used, FIG. 2A through FIG. 2F illustrates exemplary circuits for detecting capacitive sensing for a touch to the touch sensing system 100 of FIG. 1A, according to one embodiment. FIGS. 2A and 2B are simplified circuit diagrams of the exemplary touch sensing system of FIG. 1A when the target conductive node 106 is activated by an exemplary touch 206. In FIG. 2A, one or more current sources (e.g., a current source 202A and a current source 202B) may form a capacitance 204 between the touch 206 (e.g., using a finger) and the target conductive node 106.

Other target or neighboring conductive nodes which share the same I/O pin as the target conductive node 106 and one or more conductive lines which electrically couple the other target or neighboring conductive nodes and the I/O pin may be represented as the resistances (e.g., a resistance 210A and a resistance 210B) as illustrated in FIG. 2A. For example, if the touch 206 is applied on the target conductive node 106, the user's finger becomes one plate of the capacitor forming the capacitance 204, and the target conductive node 106 becomes the other plate of the capacitor. The position of the touch 206 may be determined by charging the capacitor first, discharging it and then measuring the current (e.g., voltage, frequency, etc.). During the charging, the current charges up the capacitor in typically less than one micro second.

FIG. 2B illustrates the capacitor discharging the current being measured. The current flows out from the capacitor (e.g., of ½ picofarad or 1 picofarad) when the current sources 202A and 202B are replaced with current sensors 214A and 214B coupled to the ground. The switching may take place periodically, pseudo-randomly or if the voltage (e.g., or the capacitance 204) formed on the capacitor surpasses a reference or threshold voltage (e.g., a first threshold value). In either case, the voltage begins to discharge from the capacitor, thus causing the current to flow through the current measuring device 214A and the current measuring device 214B. Based on the current measured by the current measuring devices (e.g., which operates at 6 MHz), the position of the touching object may be determined as will be illustrated in more detail in FIG. 3.

Figure 2C:
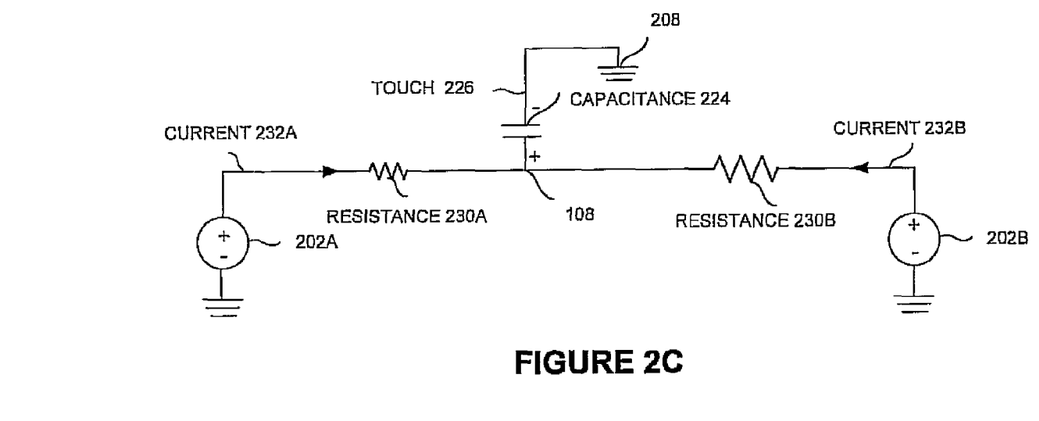
Figure 2D:
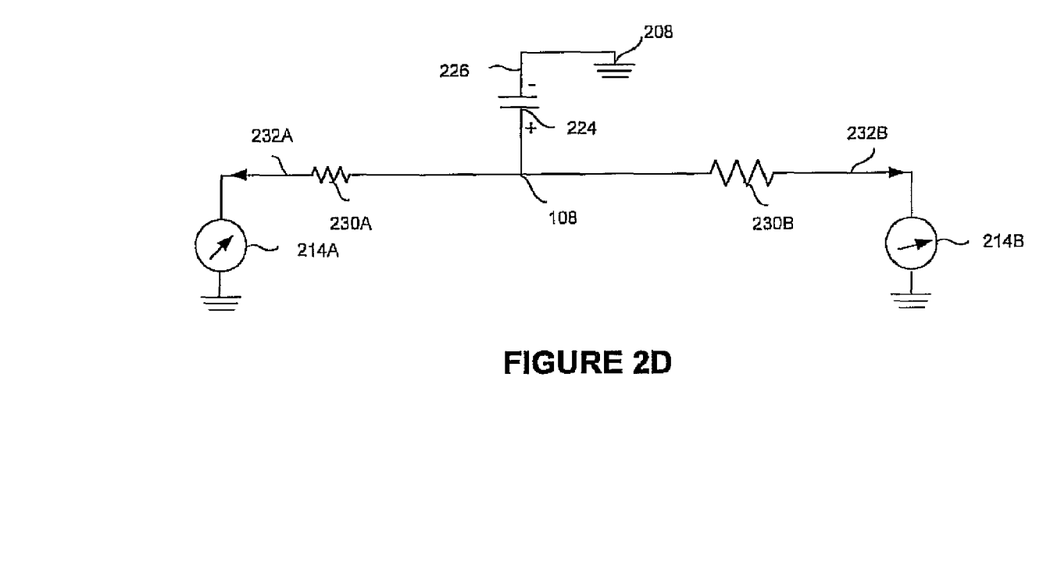

FIGS. 2C and 2D are simplified circuit diagrams of the capacitance sensing technique of the touch sensing system 100 of FIG. 1A when the neighboring conductive node 108 is activated by an exemplary touch 226. It is appreciated that the touch 226 represents a contact to the surface of the neighboring conductive node 108, whereas the touch 206 represents a contact to the surface of the target conductive node 106. In FIG. 2C, one or more current sources (e.g., a current source 202A and a current source 202B) may form a capacitance 224 between the touch 226 and the neighboring conductive node 108.

Other target or neighboring conductive nodes which share the same I/O pin as the neighboring conductive node 108 and one or more conductive lines which electrically couple the other target or neighboring conductive nodes and the I/O pin may be represented as the resistances (e.g., a resistance 230A and a resistance 230B) as illustrated in FIG. 2C. For example, if the touch 226 is applied on the neighboring conductive node 108, the user's finger becomes one plate of the capacitor forming the capacitance 224, and the neighboring conductive node 108 becomes the other plate of the capacitor. The position of the touch 226 may be determined by charging the capacitor first, discharging it and then measuring the current (e.g., voltage, frequency, etc.). During the charging, the current charges up the capacitor in typically less than one micro second.

FIG. 2D illustrates the capacitor discharging the current being measured. The current flows out from the capacitor (e.g., of ½ picofarad or 1 picofarad) when the current sources 202A and 202B are replaced with current sensors 214A and 214B coupled to the ground. The switching may take place periodically, pseudo-randomly or if the voltage (e.g., or the capacitance 224) formed on the capacitor surpasses a reference or threshold voltage (e.g., a second threshold value). In either case, the voltage begins to discharge from the capacitor, thus causing the current to flow through the current measuring device 214A and the current measuring device 214B. Based on the current measured by the current measuring devices (e.g., which operates at 6 MHz), the position of the touching object may be determined as will be illustrated in more detail in FIG. 3.

Figure 2E:
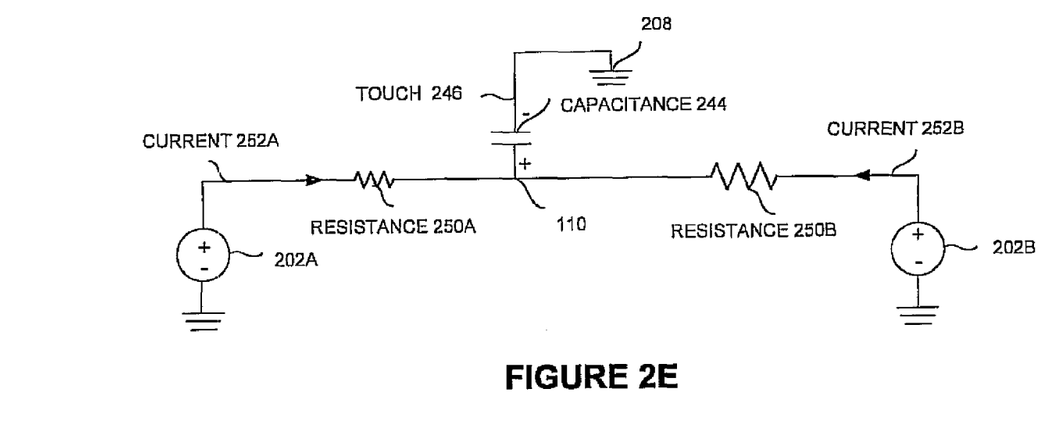
Figure 2F:
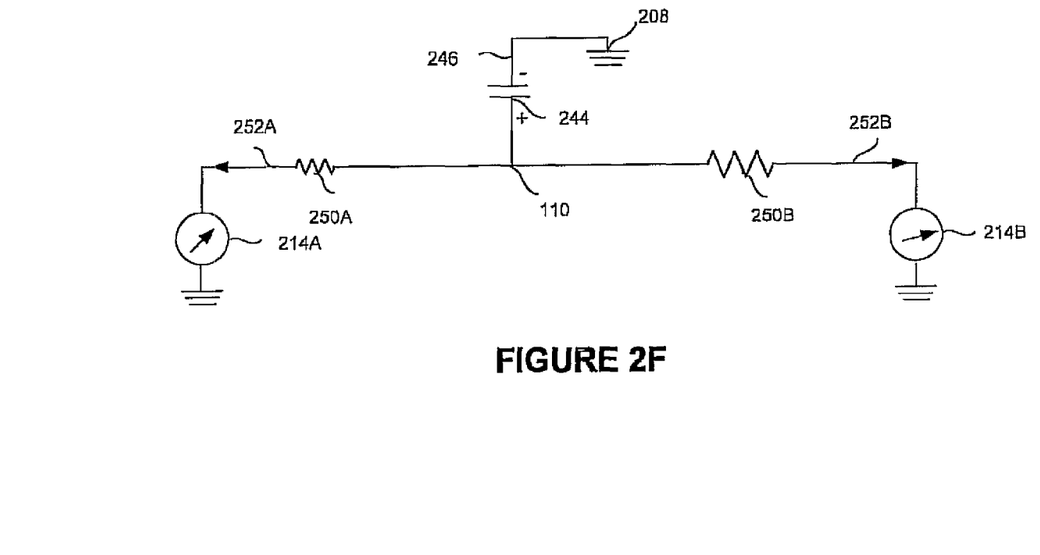

FIGS. 2E and 2F are simplified circuit diagrams of the capacitive sensing technique of the touch sensing system 100 of FIG. 1A when the neighboring conductive node 110 is activated by an exemplary touch 246. It is appreciated that the touch 246 represents a touch to the surface of the neighboring conductive node 110. In FIG. 2E, one or more current sources (e.g., a current source 202A and a current source 202B) may form a capacitance 244 between the touch 246 (e.g., using a finger) and the neighboring conductive node 110.

Other target or neighboring conductive nodes which share the same I/O pin as the target conductive node 110 and one or more conductive lines which electrically couple the other target or neighboring conductive nodes and the I/O pin may be represented as the resistances (e.g., a resistance 250A and a resistance 250B) as illustrated in FIG. 2E. For example, if the touch 246 is applied on the neighboring conductive node 110, the user's finger becomes one plate of the capacitor forming the capacitance 244, and the neighboring conductive node 110 becomes the other plate of the capacitor. The position of the touch 246 may be determined by charging the capacitor first, discharging it and then measuring the current (e.g., voltage, frequency, etc.). During the charging, the current charges up the capacitor in typically less than one micro second.

FIG. 2F illustrates the capacitor discharging the current being measured. The current flows out from the capacitor (e.g., of ½ picofarad or 1 picofarad) when the current sources 202A and 202B are replaced with current sensors 214A and 214B coupled to the ground. The switching may take place periodically, pseudo-randomly or if the voltage (e.g., or the capacitance 244) formed on the capacitor surpasses a reference or threshold voltage (e.g., a second threshold value). In either case, the voltage begins to discharge from the capacitor, thus causing the current to flow through the current measuring device 214A and the current measuring device 214B. Based on the current measured by the current measuring devices (e.g., which operates at 6 MHz), the position of the touching object may be determined as will be illustrated in more detail in FIG. 3.

In another example embodiment, a programmable device (e.g., which embeds the processor 112) may be used as the current source and current measuring device. The programmable device may rapidly switch between the current source and the current measuring device. And this is sequentially repeated across each I/O pin. For instance, a pin is selected, and the currents present on the pin are measured over period of time to get sufficient accuracy. Then, next pin may be scanned and the whole process would repeat. It is appreciated that the process of scanning the I/O pins may be performed very rapidly and continuously.

Figure 3:
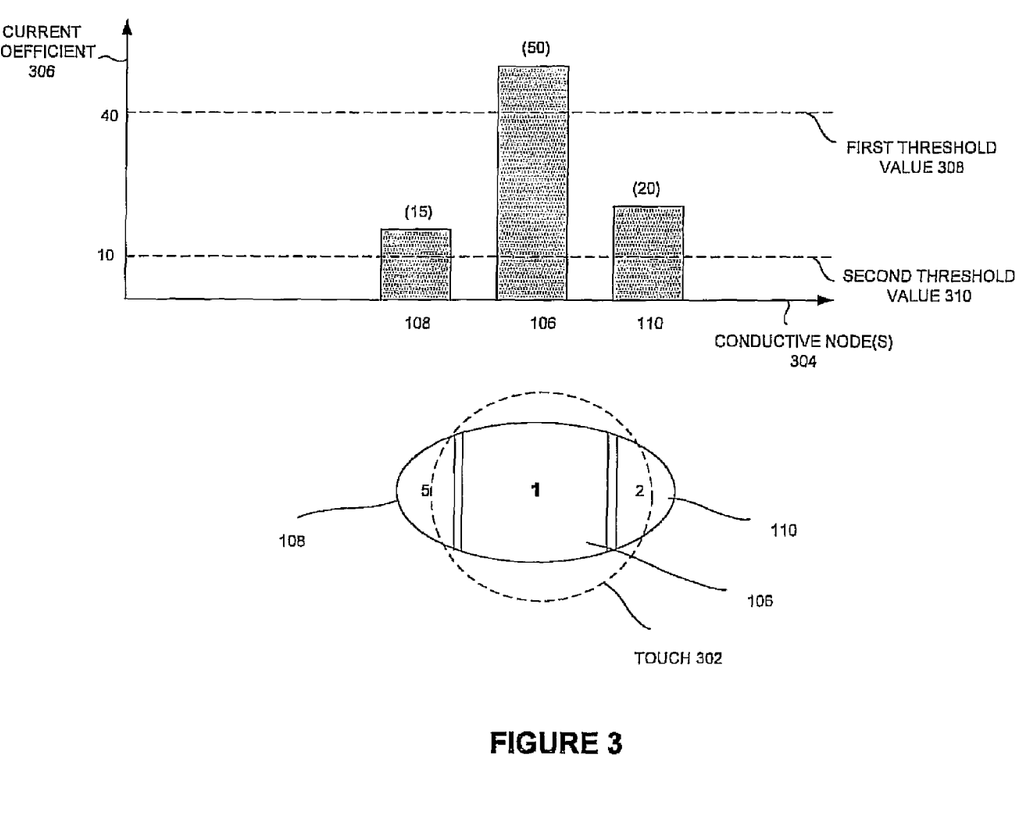
FIG. 3 illustrates an exemplary process for identifying a touch using the touch sensing system of FIG. 1A, according to one embodiment.

FIG. 3 illustrates an exemplary process of identifying a touch 302 using the touch sensing system 100 of FIG. 1A, according to one embodiment. In one exemplary implementation, a button (e.g., any predefined region of the surface of the node matrix) may be formed with a target conductive node (e.g., the target conductive node 106) and two neighboring conductive nodes (e.g., the neighboring conductive nodes 108 and 110) of the target conductive node. In addition, the target conductive node and the two neighboring conductive nodes may be operable for identifying an interaction with the button. Furthermore, in one embodiment, the size of the target conductive node 106 may be larger than the size of each of the two neighboring conductive nodes 108 and 110.

In FIG. 3, the touch 302 (e.g., of a finger) is applied across a button formed by the area of the target node 106 and the two neighboring nodes 108 and 110. Accordingly, a larger amount of current is generated on the target conductive node 106 than a current generated on either the neighboring conductive node 108 or the neighboring conductive node 110. This is due to the fact that the area of the target conductive node 106 affected by the touch 302 is bigger than the area of either the neighboring conductive node 108 or the neighboring conductive node 110 affected by the touch 302. Accordingly, a higher capacitance is formed between the touch 302 and the target conductive node 106 than the capacitance formed between the touch 302 and either one of the neighboring conductive nodes 108 and 110.

Thus, the current coefficient (e.g., 50) for the target conductive node 106 is greater than the current coefficient (e.g., 15) of the neighboring conductive node 108 or the current coefficient (e.g., 20) of the neighboring conductive node 110. In addition, the touch sensing system 100 of FIG. 1A can identify the touch 302 to the button when the current coefficient of the target conductive node 106 is greater than a first threshold value 308 (e.g., 40) and when each of the current coefficient of the neighboring conductive node 108 and the current coefficient of the neighboring conductive node 110 is greater than a second threshold value 310 (e.g., 10). Since the neighbors of each node are unique across the matrix, the specific button is properly identified on the surface of the matrix.

Figure 4:
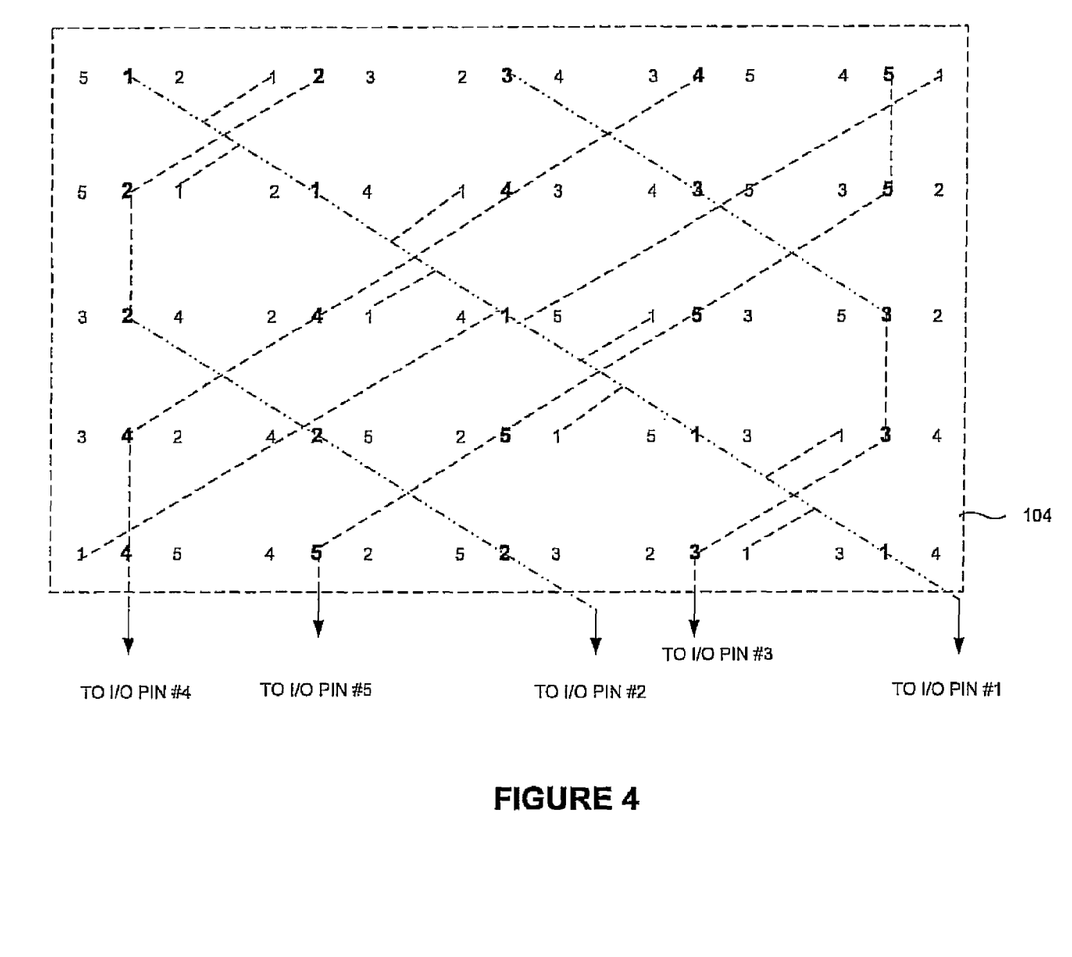
FIG. 4 is an exemplary routing layout of conductive nodes formed on the touch screen of the touch sensing system of FIG. 1A, according to one embodiment.

FIG. 4 is an exemplary routing layout of the nodes of the touch screen 102 of the touch sensing system 100 of FIG. 1A, according to one embodiment. In FIG. 4, every conductive node of a same number shares a same I/O pin is shorted to the I/O pin. FIG. 4 illustrates the complete routing diagram for pin #1. Other pin routings are partially shown for clarity. However, it is appreciated that the same routing exists for the remaining I/O pins. In one exemplary implementation, the touch screen 102 comprises a two layer touch screen where the conductive nodes 104 are formed on the first layer, and where the conductive nodes 104 are routed on the first and second layer of the touch screen 102.

In addition, the conductive nodes 104 are positioned in such a way that the routings between the conductive nodes 104 have a reduced number of crossings. For example, as illustrated in FIG. 4, target nodes (e.g., numbers in bold faced type) sharing a same I/O pin are formed diagonally so that the routings between the conductive nodes have fewer crossings than other layouts. This makes it possible to reduce the number of vias used to connect components on the first layer with components on the second layer. Accordingly, noise due to the vias can be reduced as well.

In FIG. 4, the area of one target conductive node and the area of two neighboring conductive node of the target conductive node form a button. In this fashion, many buttons are defined across the surface of the matrix. For example, a group of a target conductive node coupled to pin #5, a neighboring conductive node coupled to pin #1 and a neighboring conductive node coupled to pin #2 forms a button. It is appreciated that among the buttons illustrated in FIG. 4, each target conductive node with the same number has a different set of its neighboring conductive nodes. For example, for the target conductive nodes sharing pin #2, their respective neighboring conductive nodes are coupled to pins "13", "51", "34", "45", and "53". This allows the touch sensing system 100 of FIG. 1A to differentiate the buttons from each other using a minimal number of pins (e.g., 5 I/O pins). It is appreciated that each of the buttons can be formed and thereby recognized using (e.g., as a function of) one or more target conductive nodes and two or more neighboring conductive nodes. It is also appreciated that the touch screen 102 can be formed using different layouts of the conductive nodes 104 than the exemplary layout illustrated in FIG. 4.

Figure 5:
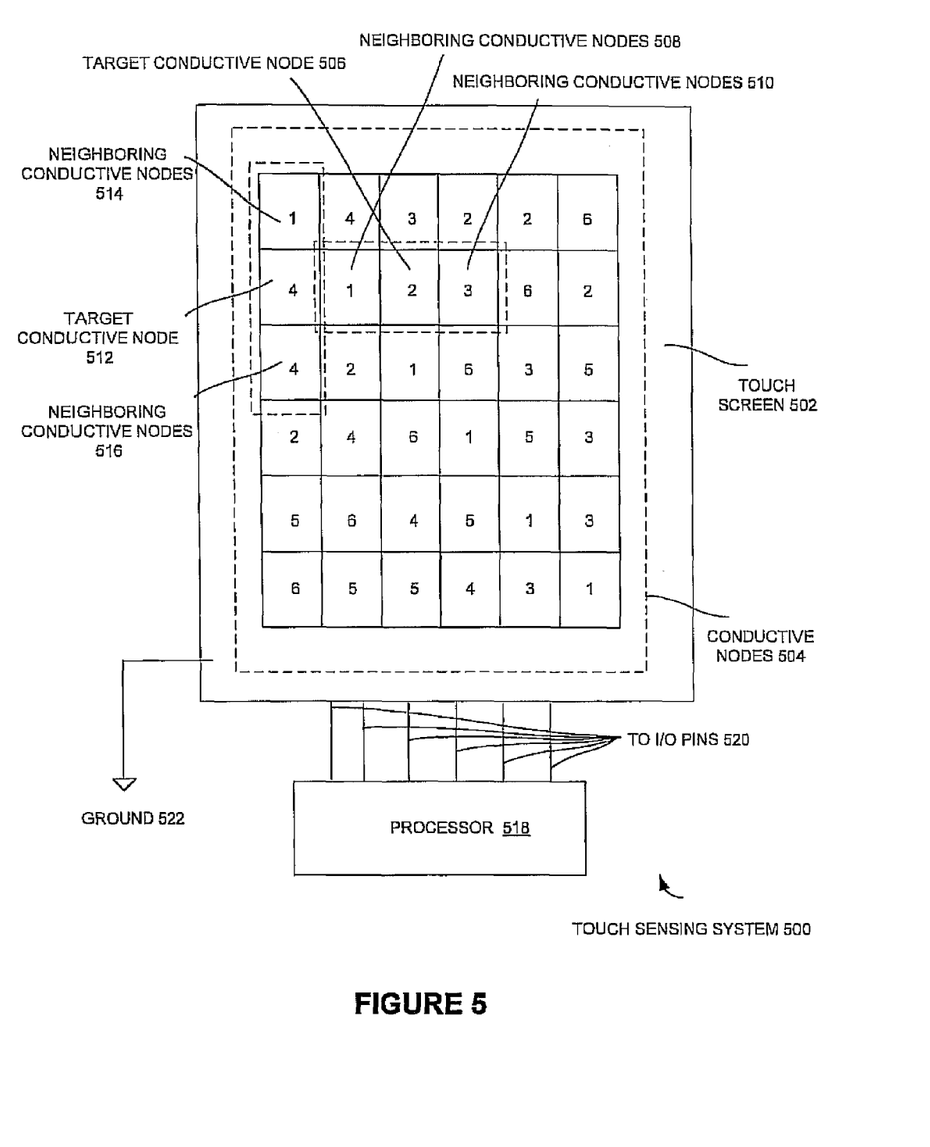
FIG. 5 is yet another exemplary touch sensing system, according to one embodiment of the present invention.

FIG. 5 is yet another exemplary touch sensing system 500, according to one embodiment. On touch screen 502, the conductive nodes 504 form a 6×6 matrix. The number on each conductive node represents the pin number it electrically couples to. It is appreciated that those conductive nodes sharing a same pin number are electrically connected. As illustrated, the conductive nodes 504 on the touch screen are spaced apart uniformly, whereas the conductive nodes 104 of FIG. 1A are grouped in threes to form a button.

Similar to the button layout of FIG. 1A, each button in the button layout of FIG. 5 is formed by three adjacent conductive nodes. However, there is no designated target button in the layout as illustrated in FIG. 5. Instead, the layout is designed such that a user's finger is to cover three adjacent conductive nodes either horizontally or vertically for activating the button, where the center conductive node performs the role of the target conductive node as in FIG. 1A. In the case where user touches more or less than three adjacent conductive nodes, the touch may be processed as an invalid input. Additionally, if the user touches diagonally adjacent conductive nodes, the touch may also be processed as an invalid input.

In addition, in FIG. 5, each target or center conductive node can have one or two different neighboring nodes, whereas every target conductive node in the button layout of FIG. 1A has two neighboring buttons. For example, the button made of three conductive nodes (e.g., a target conductive node 506, a neighboring conductive node 508 and a neighboring conductive node 510), which couple to I/O pin #1, I/O pin #2 and I/O pin #3, respectively, has two different conductive nodes flanking the center conductive node. On the other hand, the button made of three conductive nodes, which couple to I/O pin #1, I/O pin #4 and I/O pin #4, respectively, has a single neighboring conductive node. Thus, the touch sensing system 500 may employ two different algorithms to identify the activated button. That is, the first algorithm may be used for processing the buttons having two different neighboring conductive nodes, whereas the second algorithm may be used for processing the buttons having a single neighboring conductive node. The matrix layout of nodes is selected to offer unique node combinations for both algorithms so that unique button touches are always detected.

It is appreciated that in FIG. 5, each button can be formed using three or more conductive nodes. It is also appreciated that the conductive nodes 504 can be arranged differently than what is illustrated in FIG. 5. It is further appreciated that the touch sensing system 500 works in a similar manner as the touch sensing system 100 of FIG. 1A in identifying an activated button. Additionally, icons or buttons can be implemented on the touch screen 502 in several different ways by associating the conductive nodes 504 and their respective I/O pins different ways.

Figure 6:
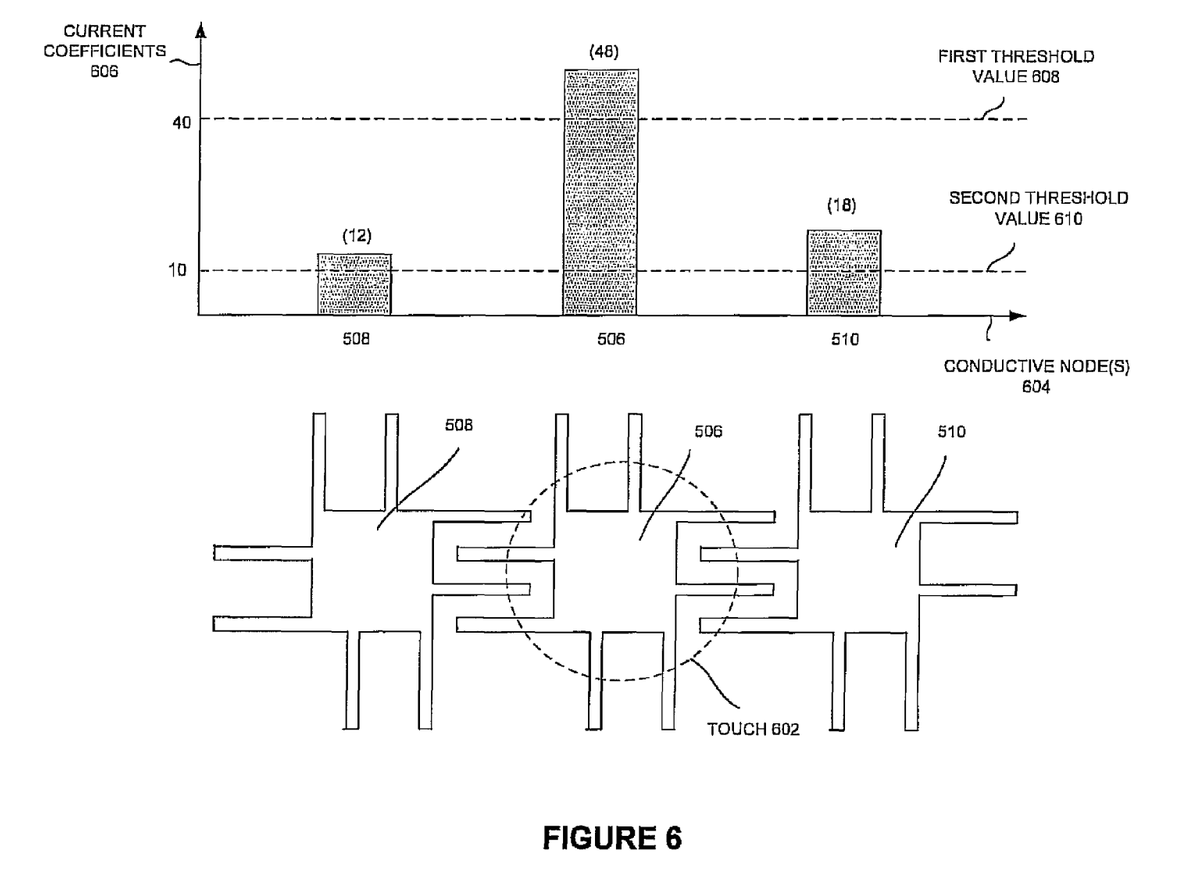
FIG. 6 illustrates an exemplary process for identifying a touch using the touch sensing system of FIG. 5, according to one embodiment.

FIG. 6 illustrates diagrams helpful in describing an exemplary process of identifying a touch 602 using the touch sensing system 500 of FIG. 5, according to one embodiment. In one exemplary implementation, a button may be formed with the target conductive node 506 and the neighboring conductive nodes 508 and 510, where the target conductive node 506 and the two neighboring conductive nodes 508 and 510 may be operable for identifying a touch 602. Furthermore, as illustrated in FIG. 6, each conductive node is a button or shape that comprises a main area of a square shape and several extended strips (e.g., 8) from the main area.

As illustrated in FIG. 6, when the touch 602 is applied across the button formed by the area of the target conductive node 506 and the two neighboring conductive nodes 508 and 510, it comes in contact with most o the area of the target conductive node 506 and some extended strips of the neighboring conductive nodes 508 and 510. Accordingly, more current is generated on the target conductive node 506 than a current generated on the neighboring conductive node 508 or the neighboring conductive node 510. This is due to the fact that a higher capacitance is formed between the touch 602 and the target conductive node 506 than the capacitance formed between the touch 602 and either one of the neighboring conductive nodes 508 and 510.

Thus, the current coefficient (e.g., 48) for the target conductive node 506 is greater than the current coefficient (e.g., 12) for the neighboring conductive node 508 or the current coefficient (e.g., 18) of the neighboring conductive node 510. In addition, the touch sensing system 500 of FIG. 5 can identify the touch 602 to the button when the current coefficient of the target conductive node 506 is greater than a first threshold value 608 (e.g., 40) and when each of the current coefficient of the neighboring conductive node 508 and the current coefficient of the neighboring conductive node 510 is greater than a second threshold value 610 (e.g., 10). In case, the current coefficients created by the touch 602 do not meet their respective threshold values, the touch 602 to the button is processed as an invalid input.

Figure 7:
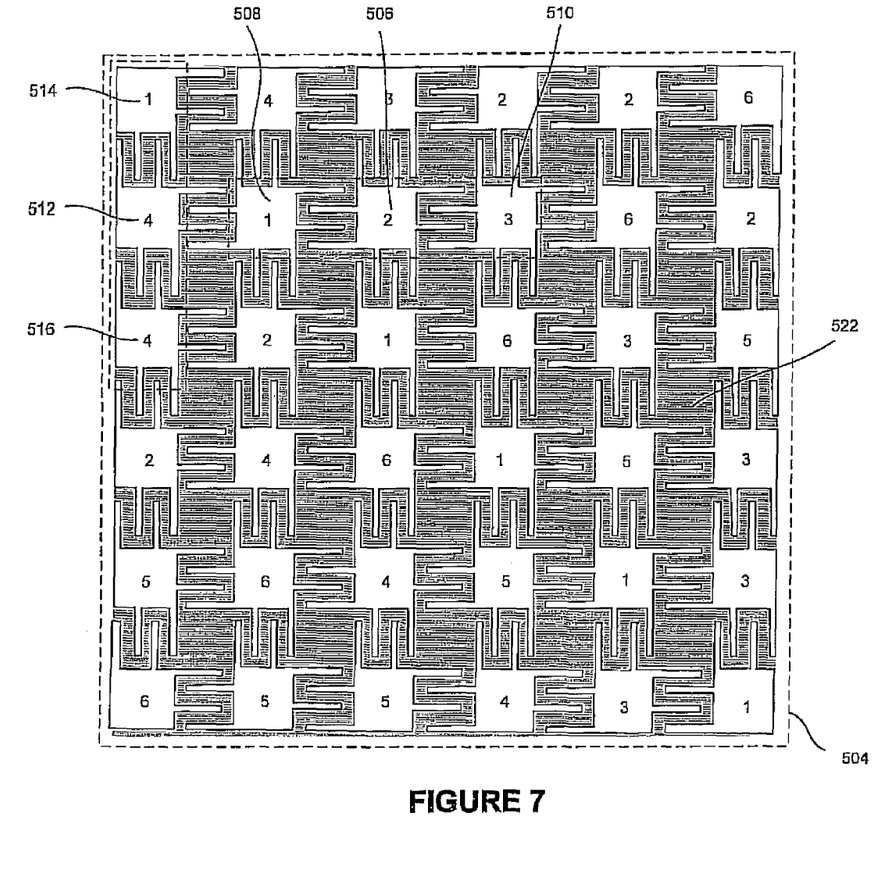
FIG. 7 illustrates an exemplary physical layout of the conductive nodes of the touch sensing system of FIG. 5, according to one embodiment.

FIG. 7 illustrates an exemplary physical layout of the conductive nodes 504 of the touch sensing system 500 of FIG. 5, according to one embodiment. In FIG. 7, every conductive node with a same number is coupled to a same I/O pin although the traces are not shown. It is appreciated that the conductive nodes 504 and their electrical connections among themselves and to their respective I/O pins are embedded in a two layer touch screen in a similar manner to the layout illustrated in FIG. 4. As a result, a noise due to a wire crossing or via can be effectively reduced.

In FIG. 7, each conductive node sharing a same pin number has either a single neighboring conductive node (see corners) or two neighboring conductive nodes. In either case, the set of neighbors is unique to each node within the matrix. In one exemplary implementation, one target conductive node and two neighboring conductive nodes of the target conductive node form a button. For example, the target conductive node 506 coupled to pin #1, the neighboring conductive node 508 coupled to pin #2 and the neighboring conductive node 510 coupled to pin #3 form a button.

In another exemplary implementation, one target conductive node and two neighboring conductive nodes of the target conductive node that share the same pin form a button. For example, the target conductive node 512 coupled to pin #4, the neighboring conductive node coupled to pin #1 514 and the neighboring conductive node coupled to pin #4 form a button.

It is appreciated that a button can be formed using more than one target conductive node and/or more than two neighboring conductive nodes. It is also appreciated that the conductive nodes 502 can be formed in a different layout than what is illustrated in FIG. 7. It is further appreciated that the area between the conductive nodes 504 is shorted to the ground 522 so that an invalid input may not initiate any software function.

Figure 8:
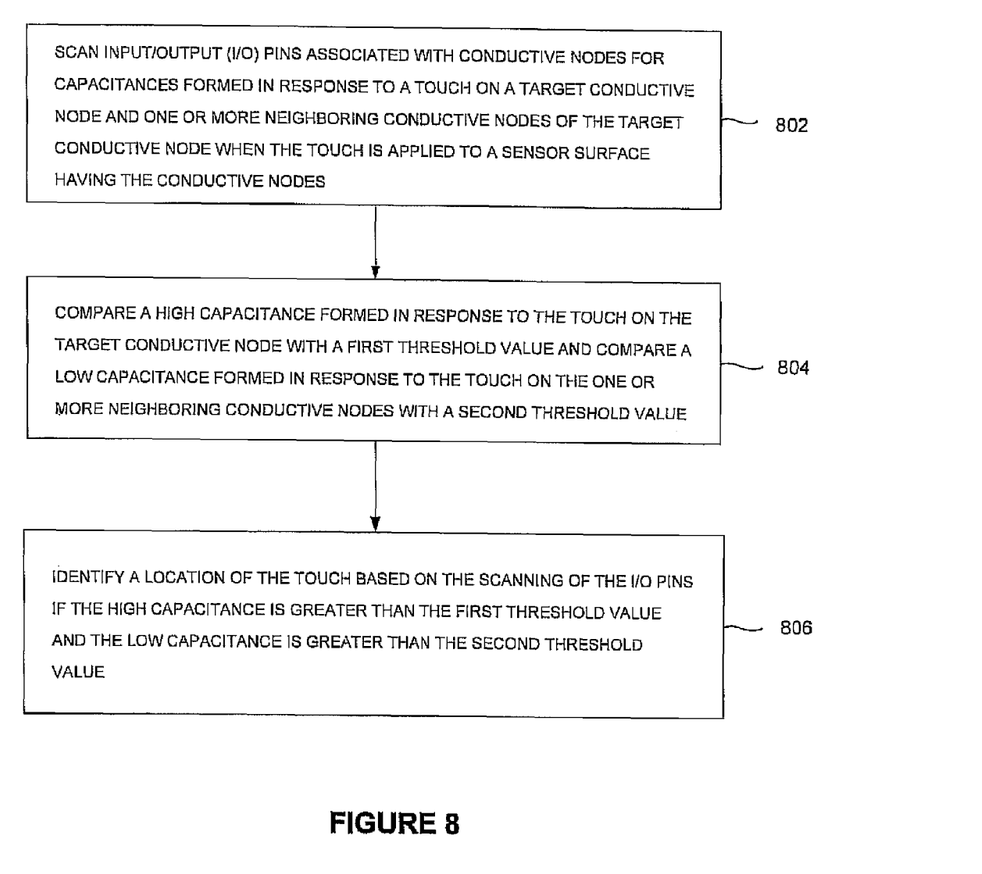
FIG. 8 is a process flow chart of an exemplary method for identifying a touch on a touch sensing system of the present invention, according to one embodiment.

FIG. 8 is a process flow chart of an exemplary method for identifying a touch on a touch sensing system, according to one embodiment. In operation 802, input/output (I/O) pins associated with conductive nodes are scanned for capacitances formed in response to a touch on a target conductive node and one or more neighboring conductive nodes of the target conductive node when the touch is applied to a touch screen having the conductive nodes. In one exemplary implementation, the conductive nodes may be arranged in a matrix. Additionally, the neighboring conductive nodes for each target conductive node may comprise two conductive nodes.

In operation 804, a high capacitance formed in response to the touch on the target conductive node is compared with a first threshold value, and a low capacitance formed in response to the touch on the neighboring conductive touch node is compared with a second threshold value. In operation 806, the target conductive node is identified based on the scanning of the I/O pins if the high capacitance is greater than the first threshold value and the low capacitance is greater than the second threshold value. In operation 806, a unique button can be determined based on the node identified as the target and the node or nodes identified as the neighbor because neighbor assignments within the matrix are unique to each target node.

The previous description of the disclosed embodiments is provided to enable any person skilled in the art to make or use the present invention. Various modifications to these embodiments will be readily apparent to those skilled in the art, and the generic principles defined herein may be applied to other embodiments without departing from the spirit or scope of the invention. Thus, the present disclosure is not intended to be limited to the embodiments shown herein but is to be accorded the widest scope consistent with the principles and features disclosed herein.

What is claimed is:
1. A touch sensing system comprising:
  a touch panel having a plurality of touch button areas, each having a target conductive node and two neighboring conductive nodes, wherein a shape of each of the plural- ity of touch button areas is designed such that a touch detected at one of the plurality of touch button areas results in a first capacitance on one of the two neighboring conductive nodes of the one of the plurality of touch button areas, a second capacitance on the other one of the two neighboring conductive nodes, and a third capacitance on the target conductive node of the one of the plurality of touch button areas, wherein the first capacitance and the second capacitance are lower than the third capacitance; and a processor coupled to the touch panel to locate the touch on a surface of the touch panel by processing signals representing the first capacitance, the second capacitance, and the third capacitance, wherein the conductive nodes of the plurality of touch button areas are coupled to input/output (I/O) pins of the processor, wherein two or more of the target conductive nodes are coupled to a same I/O pin and each have at least one of the their two neighboring conductive nodes coupled to a different I/O pin, wherein the processor is configured to distinguish between touches detected at the two or more of the target conductive nodes based on a unique combination of the I/O pins over which the signals representing the first capacitance, second capacitance, and the third capacitance are received.

2. The touch sensing system of claim 1, wherein the target conductive node is larger than each of the two neighboring conductive nodes.

3. The touch sensing system of claim 1, wherein the processor is operable to process a valid touch when the third capacitance is greater than a first threshold value and the first capacitance and the second capacitance are greater than a second threshold value.

4. The touch sensing system of claim 1, wherein the target conductive nodes are arranged in a set of N by M nodes, wherein N and M are integers, and wherein the I/O pins comprise less than N plus M number of pins.

5. The touch sensing system of claim 1, wherein the target conductive nodes are arranged in one of a column, a row and a diagonal.

6. The system of claim 1, wherein the processing signals represented by the first capacitance, the second capacitance, and the third capacitance comprises processing currents generated in response to the touch, the currents simultaneously flowing from a capacitor of at least one of the target conductive nodes.

7. The touch sensing system of claim 6, wherein the touch panel comprises two layers, wherein conductive nodes of the plurality of touch button areas are formed on a first layer of the touch panel, and wherein routings between the conductive nodes of the plurality of touch button areas are formed on the first layer and a second layer of the touch panel.

8. A touch sensing device comprising:
a touch panel having a set of nodes comprising a plurality of conductive nodes, wherein a shape of each conductive node is designed such that a touch detected at one of the plurality of conductive nodes with a conductive object results in a first type capacitance of the one of the plurality of conductive nodes and a second type capacitance of two neighboring conductive nodes that neighbor the one of the plurality of conductive nodes; and
a processor coupled to the set to locate the touch by processing the second type capacitance and the first type capacitance, wherein each of the plurality of conductive nodes is coupled to an input/output (I/O) pin of the processor, and wherein two or more of the plurality of conductive nodes are coupled to a same I/O pin and have a neighboring conductive node coupled to different I/O pins, wherein each I/O pin receives both an input and an output signal as part of self-capacitance sensing, wherein the processor is configured to distinguish between the two or more of the plurality of conductive nodes based on a unique combination of I/O pins over which representations of the first type capacitance and the second type capacitance are received, wherein the plurality of conductive nodes are arranged in a set of M by M nodes, wherein M is an integer, and wherein the I/O pins are less than 2M in number.

9. The touch sensing device of claim 8, wherein an area comprising the one of the plurality of conductive nodes and the two neighboring conductive nodes forms a touch button.

10. The touch sensing device of claim 9, wherein the processor is operable to process a touch as valid when the first type capacitance is greater than a first threshold value and when the second type capacitance is greater than a second threshold value.

11. The touch sensing device of claim 8, wherein the processing the second type capacitance and the first type capacitance comprises processing currents generated in response to the touch, the currents simultaneously flowing from a capacitor of at least one of the plurality of conductive nodes.

12. A method comprising:
scanning input/output (I/O) pins associated with conductive nodes of a plurality of touch button areas of a touch panel for capacitances formed in response to a touch detected at one of the plurality of touch button areas, each of the plurality of touch button areas having a target conductive node and two neighboring conductive nodes, wherein two or more of the target conductive nodes are coupled to a same I/O pin and each have at least one of the their two neighboring conductive nodes coupled to a different I/O pin;
comparing a first capacitance formed in response to the touch detected at the target conductive node of the one of the plurality of touch button areas with a first threshold value and comparing a second capacitance and a third capacitance formed in response to the touch detected at the two neighboring conductive nodes with a second threshold value; and
identifying a location of the touch based on a unique combination of the I/O pins over which representations of the first capacitance, second capacitance, and the third capacitance are received, the first capacitance being greater than the first threshold value, and the second capacitance and third capacitance being greater than the second threshold value.

13. The method of claim 12, wherein the target conductive node is in between the two neighboring conductive nodes.

14. The method of claim 12, wherein the target conductive nodes are arranged in an N by M set, wherein N and M are integers and, wherein the I/O pins are less than N plus M in number.

15. The method of claim 12, wherein the identifying the location of the touch based on the unique combination of the I/O pins comprises processing currents generated in response to the touch, the currents simultaneously flowing from a capacitor of at least one of the target conductive nodes.

* * * * *